United States Patent [19]

Hutchison et al.

[11] Patent Number: 6,026,428
[45] Date of Patent: *Feb. 15, 2000

[54] OBJECT ORIENTED THREAD CONTEXT MANAGER, METHOD AND COMPUTER PROGRAM PRODUCT FOR OBJECT ORIENTED THREAD CONTEXT MANAGEMENT

[75] Inventors: Gordon Douglas Hutchison, Eastleigh, United Kingdom; Charlie James Redlin; Peter John Schommer, both of Rochester, Minn.

[73] Assignee: International Business Machines Corporation, Armonk, N.Y.

[ * ] Notice: This patent is subject to a terminal disclaimer.

[21] Appl. No.: 08/910,723

[22] Filed: Aug. 13, 1997

[51] Int. Cl.[7] .................................................. G06F 9/00
[52] U.S. Cl. ........................................ 709/108; 709/100
[58] Field of Search .................................. 395/678, 682, 395/670, 680, 800; 709/100, 108, 302, 300; 707/1, 2, 6

[56] References Cited

U.S. PATENT DOCUMENTS 5,613,114  3/1997  Anderson ................................ 395/678
5,659,694  8/1997  Bibayan .
5,893,912  4/1999  Freund et al. ......................... 707/103

OTHER PUBLICATIONS

"The Common Object Request Broker: Architecture and Specification", CORBA V2.0, Revision 2.0 Jul. 1995, Updated Jul. 1996.

Primary Examiner—Majid A. Banankhah
Attorney, Agent, or Firm—Joan Pennington

[57] ABSTRACT

An object oriented thread context manager, a method and computer program product are provided for object oriented thread context management. A context manager is provided for managing a plurality of ContextControl objects. Each ContextControl object comprises a plurality of methods for creating and suspending context on a thread for a target object. When a method request for a target object is received at a server process, the server process calls a thread manager requesting a thread. The thread manager calls the context manager for associating context with a current thread for the method request. Responsive to the context manager providing associated context with the current thread, the thread manager dispatches the method request for the target object. The thread manager calls the context manager for disassociating context with the current thread.

10 Claims, 10 Drawing Sheets

REGISTRATION INTERFACE METHODS
FOR CONTEXTCONTROL OBJECTS 140
BY CONTEXT COORDINATOR 204

REGISTER CONTEXTCONTROL(CONTEXTCONTROLNAME,
ABCCONTEXTCONTROLPTR) 220

CONTEXTCONTROLID REGISTER CONTEXTCONTROLFORID
(CONTEXTCONTROLNAME, ABCCONTEXTCONTROLPTR) 222

ABCCONTEXT CONTROL PTR UNREGISTERCONTEXTCONTROL
(CONTEXTCONTROLNAME) 226

FIG. 2B

OBJECT ORIENTED THREAD CONTEXT MANAGER, METHOD AND COMPUTER PROGRAM PRODUCT FOR OBJECT ORIENTED THREAD CONTEXT MANAGEMENT

FIELD OF THE INVENTION

The present invention relates to the data processing field, and more particularly, relates to an object oriented thread context manager, method and computer program product for object oriented thread context management.

DESCRIPTION OF THE RELATED ART

As used in the description, the following terms are defined as:

Context generally represents information about the client, environment, or service. Default context means a minimal or vanilla context on a thread required by some services to process any request. Context is that information which a service needs to coordinate successive calls to the service.

An object is an entity that may contain or receive data, and that may be assigned a name which may be used to reference the object. An object may include a plurality of processes or methods.

Service is an execution environment entity which provides a resource to an executing method request. A target object means an object on the server which is the target of the incoming method request.

A thread is the element that is scheduled, and to which resources such as execution time, locks and queues may be assigned in a computer operating system environment. An execution thread is a thread in which a method request is dispatched on a target object.

On a server, programs and services may be used on behalf of many users, including other programs. A program or service often needs to keep information or perform setup which is specific to a given user. The information kept, and setup performed is referred to as Context. Furthermore, in a distributed environment, some information referred to as Service Context may need to be transmitted from outside the process and used to help map user context onto a thread. Service Context is described by a CORBA standard, "The Common Object Request Broker: Architecture and Specification, pg. 10–18.

When a request to execute code comes into a server, the server must make sure that the correct context for the code, and for the services used on behalf of the code, is set up before that code executes. For a multi-threaded server this means that the correct context must be established on the thread of execution prior to the requested code being executed.

For example, a user may be represented by a userID and password. A server often receives requests from many different clients with different userIDs and passwords. A service may decide to maintain context information based on the userID that came into the server on a method request. Further, the service may need to change its state based on the userID by perhaps validating the password and enabling a set of privileges. In this case, the userID and password would be context information whereas the set of privileges which are enabled would also be context in the sense that it enabled a needed state of the service prior to the actual execution of the method request. Another user could be a transaction. A transaction service may maintain specific information for each transaction in progress and a transactionID could be used as context information.

A problem resides in the fact that different programs and services often have different mechanisms for managing the mapping from a given user to a given context. For example, some database programs store all their context information for a given transaction based on the thread ID from which the database program was called. Therefore, if multiple requests for the same transaction come into the server, those requests must run on the same thread, otherwise the database program will not use the correct context. For another example, some database programs provide means to allow you to take a context off of a thread or put a context on a thread. Now multiple requests for the same transaction are no longer required to run on the same thread, but this requires management of mapping users to Contexts.

Another problem results once you have a Context set up on a thread and now you want to move to a different thread. With databases that require that multiple requests for the same transaction run on the same thread, it is not possible to move to a different thread, while with other database programs it is possible to move to a different thread.

Servers often have to support programs and services which have multiple ways of handling Context. A need exists for a flexible mechanism to allow all of these programs/services to coexist and yet have the execution thread have the proper Context set up.

SUMMARY OF THE INVENTION

A principal object of the present invention is to provide an object oriented thread context manager, method and computer program product for object oriented thread context management. Other important objects of the present invention are to provide such object oriented thread context manager, method and computer program product substantially without negative effect and that overcome many of the disadvantages of prior art arrangements.

In brief, an object oriented thread context manager, a method and computer program product are provided for object oriented thread context management. A context manager is provided for managing a plurality of ContextControl objects. Each ContextControl object comprises a plurality of methods for creating and suspending context on a thread for a target object. When a method request for a target object is received at a server process, the server process calls a thread manager for a thread. The thread manager calls the context manager for associating context with a current thread for the method request. Responsive to the context manager providing associated context with the current thread, the thread manager dispatches the method request for the target object. The thread manager calls the context manager for disassociating context with the current thread.

BRIEF DESCRIPTION OF THE DRAWINGS

The present invention together with the above and other objects and advantages may best be understood from the following detailed description of the preferred embodiments of the invention illustrated in the drawings, wherein:

FIG. 2B is a block diagram representation illustrating methods for registering and unregistering the ContextControl objects of FIG. 1C;

DETAILED DESCRIPTION OF THE PREFERRED EMBODIMENTS

Figure 1A:
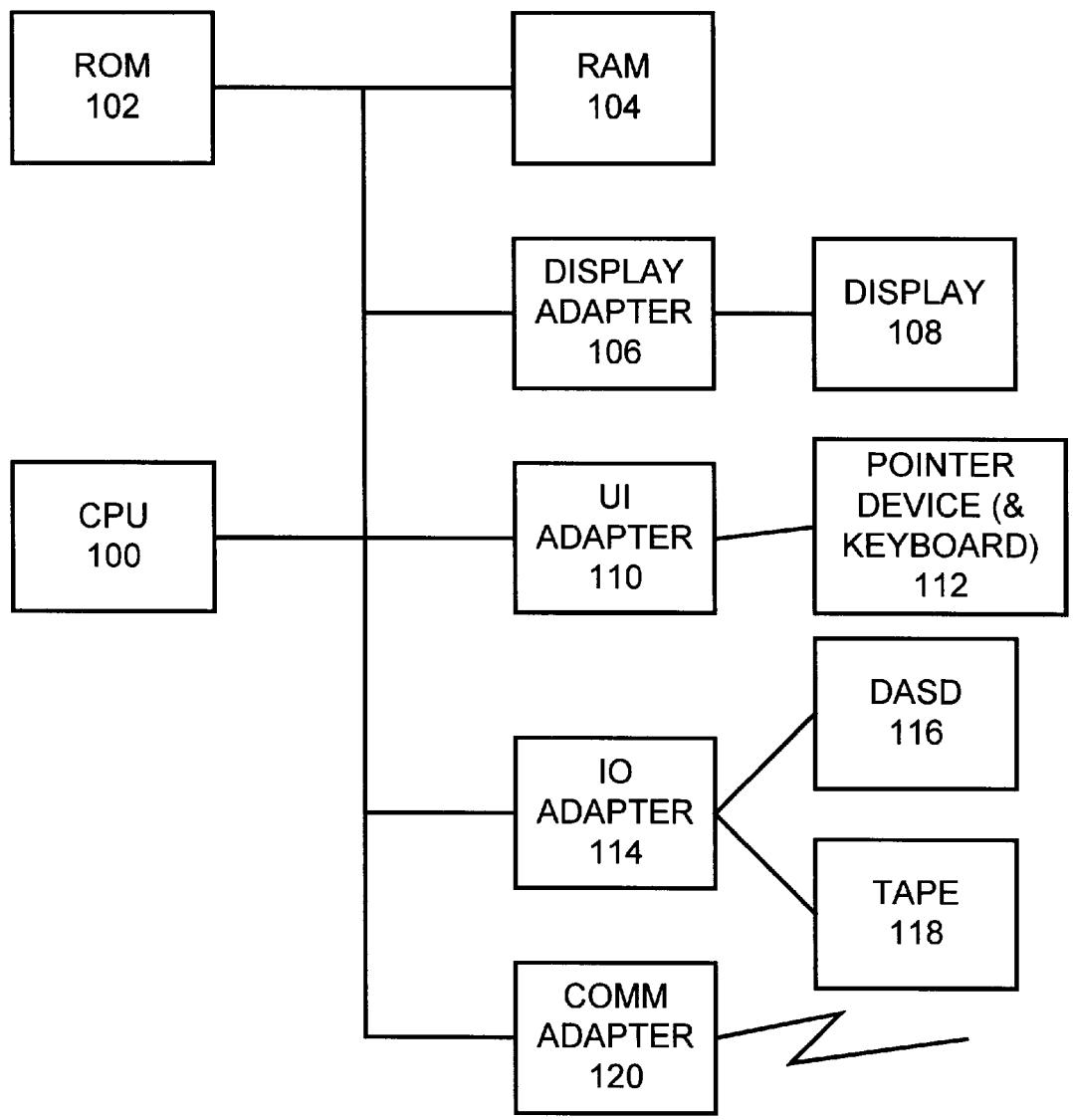
FIGS. 1A and 1B are block diagram representations illustrating a computer system and operating system for implementing a method for object oriented thread context management in accordance with the preferred embodiment.
Figure 1B:
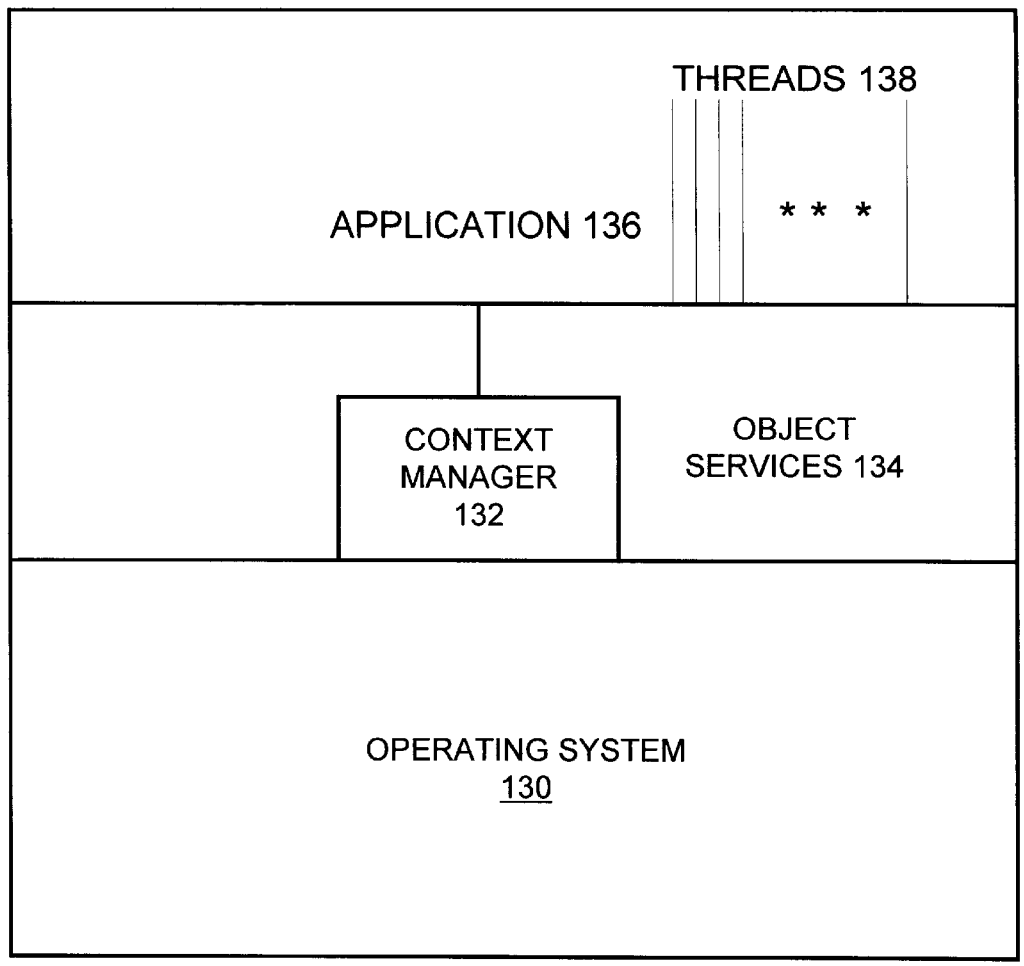

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function.

As shown in FIG. 1B, computer system 100 includes an operating system 130 and a middleware operating layer including a context manager 132 and multiple object services 134 of the preferred embodiment. An application 136 and a plurality of threads 138 are supported by the operating system 130 including the context manager 132 and multiple object services 134. Various commercially available processors could be used for computer system 100, for example, an IBM personal computer, similar workstation or mainframe computer can be used. Central processor unit 101 is suitably programmed to execute the flowcharts of FIGS. 3A, 3B and 4A, 4B of the preferred embodiment.

Figure 3A:
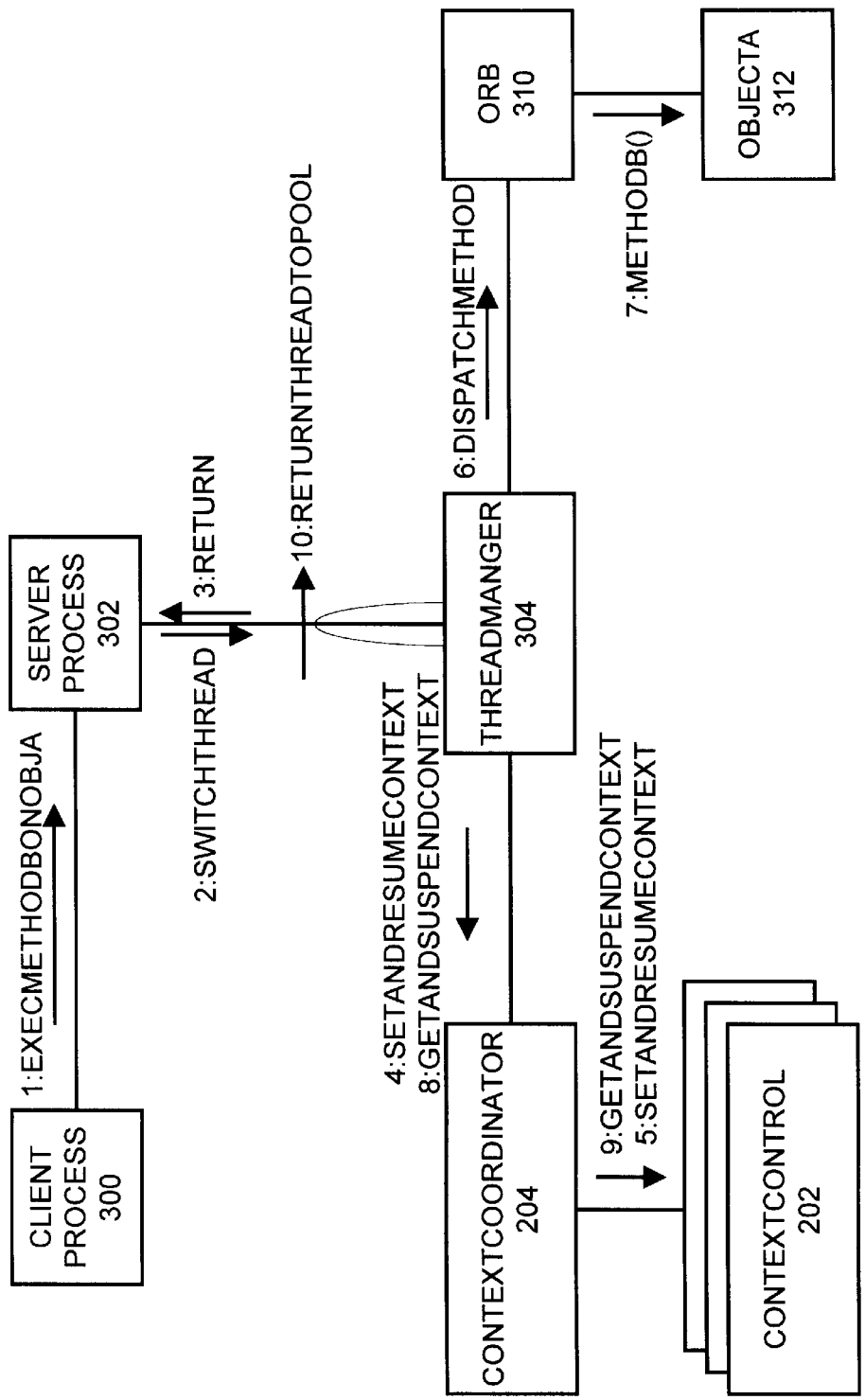
FIGS. 3A and 3B together provide a flow chart illustrating exemplary sequential steps or calls when a request to execute a method on an object is received by a server process in accordance with the preferred embodiment.
Figure 3B:
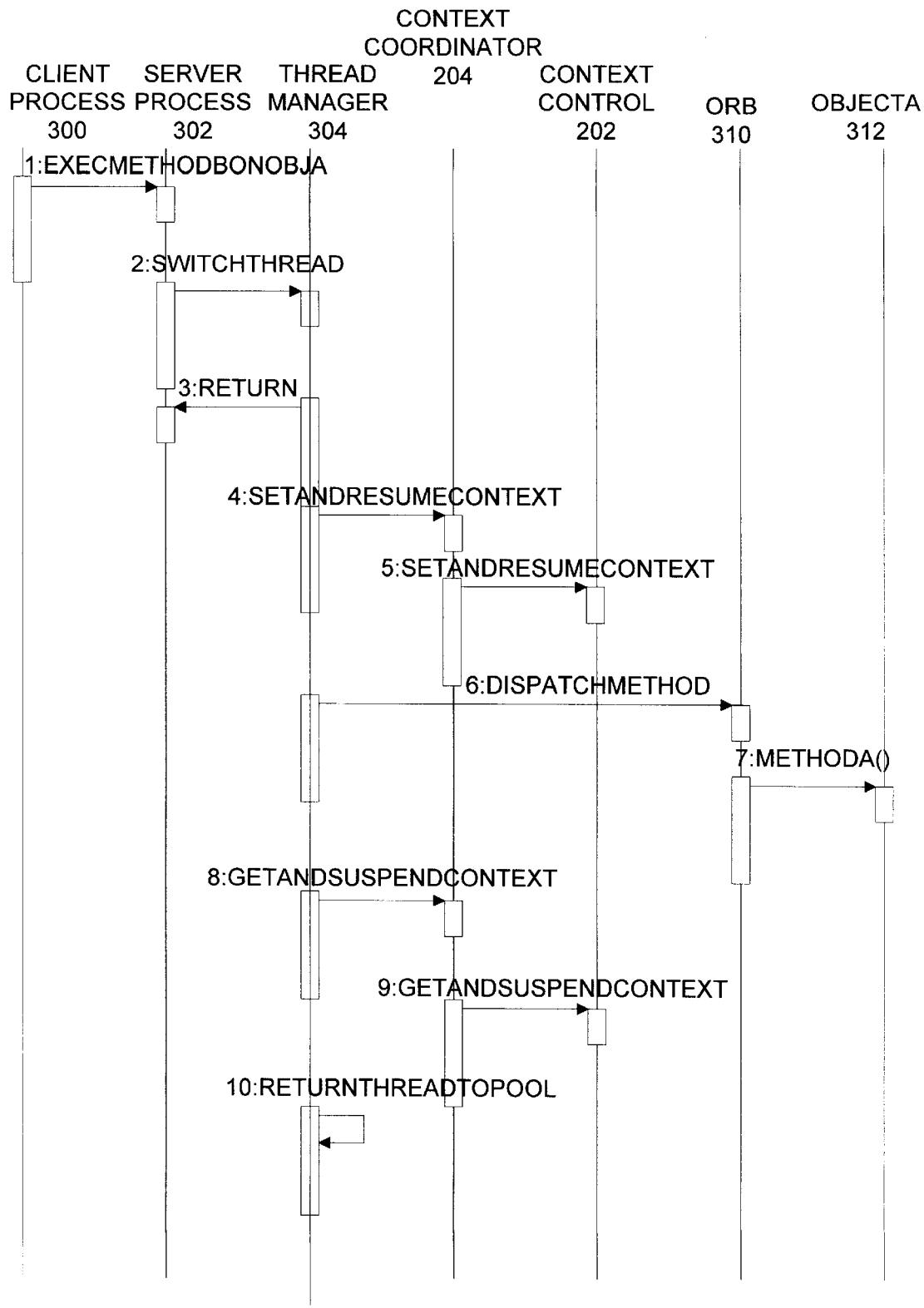

In accordance with features of the preferred embodiment, the architecture of context manager 132 is used by a thread manager 304 of FIGS. 3A, 3B and 4A, 4B or other services to have a thread 138 set up with the appropriate context before executing a method request on a target object, such as object 312 of FIGS. 3A and 3B. Similarly, the thread manager 304 also uses this architecture of context manager 132 to remove context from a thread 138, or change some execution state, such as suspending a database connection, once the method request has completed executing so that the thread 138 may be reused.

Figure 1C:
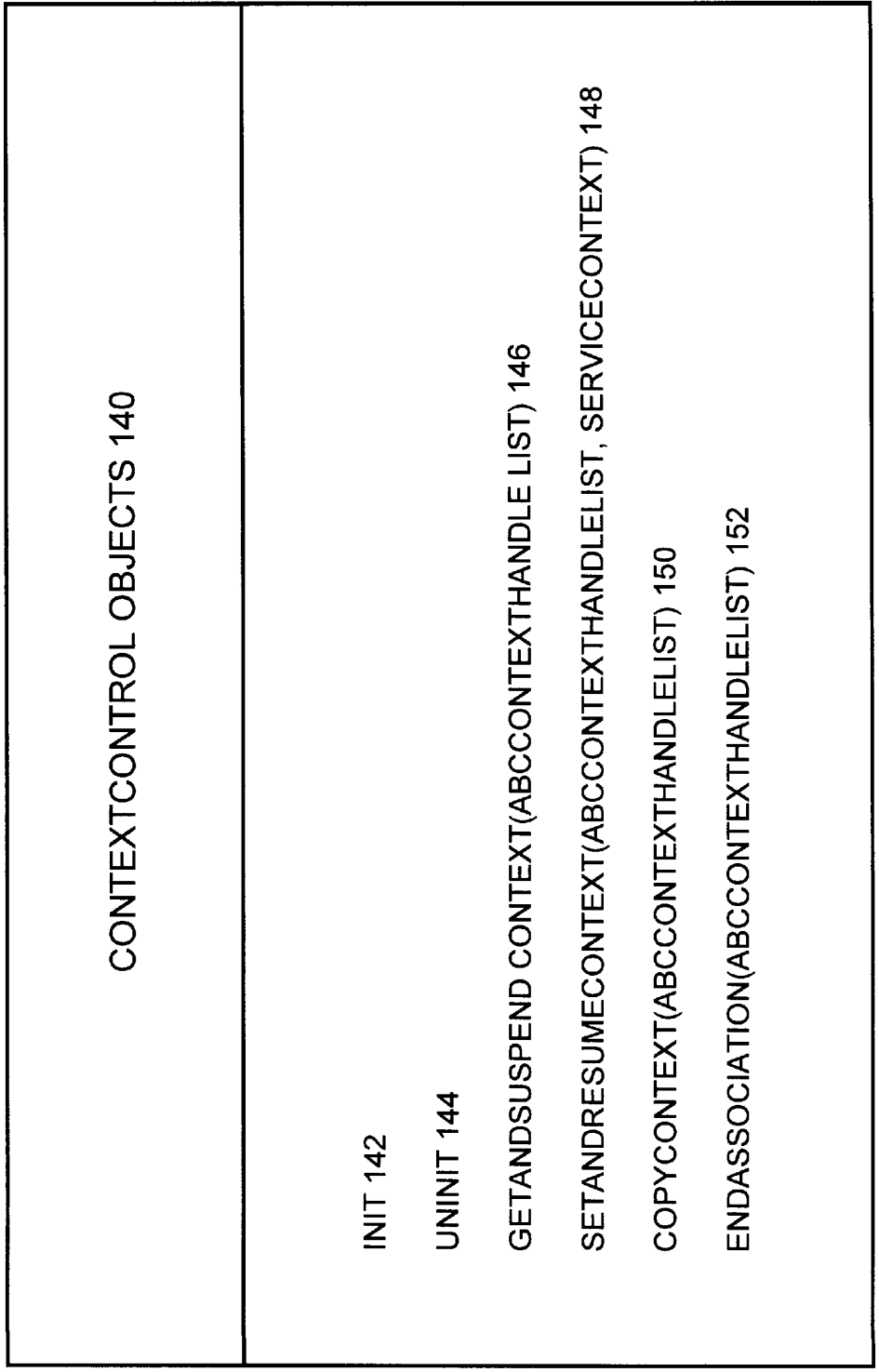
FIG. 1C is a block diagram representation illustrating methods comprising a ContextControl object in accordance with the preferred embodiment.

The general purpose of a ContextControl object 140 of FIG. 1C is to manage context relative to the lifecycle of an individual thread 138, and manage context across multiple threads 138 when those threads are executing requests which are associated with one another. It is understood that services will deal with context relative to threads 138 in one of two ways. A first type of services requires that the request is moved to the thread 138 which has a specific context on it. This first type of services are not capable of moving their context from one thread to another. A second type of services 134 can add context to the thread 138 where the request is executing. Since the context can be added to any thread 138, it can also be moved from one thread to another.

In accordance with features of the preferred embodiment, ContextControl Objects 140 are used to create and destroy context on threads 138 for both the first type of service, where multiple requests for the same transaction run on the same thread, and the second type of service, where multiple requests for the same transaction can run on different threads. In addition, to move from one thread 138 to another thread 138, the ContextControl Objects 140 are used to remove context from the one thread 138 and to add context to the other thread 138 for the second type of service.

To put onto a thread 138 means making the context information accessible to services executing on a given thread 138, in the format familiar to the service, such as an object service 134. To take off of a thread means removing the context information from a given thread 138. Resume is the process of associating/reassociating a context with the current execution thread. Suspend is the process of disassociating a context from the current execution thread.

As illustrated in FIG. 1C, the ContextControl Objects 140 includes six methods shown in all capital letters in FIG. 1C, while a mixed case naming convention is used where for method names composed of more than one word, the first letter of words after the first word are capitalized, as follows:

1. init() 142;
2. uninit 144;
3. getAndSuspendContext(ABCContextHandleList) 146;
4. setAndResumeContext(ABCContextHandleList, ServiceContext) 148;
5. copyContext(ABCContextHandleList) 150; and
6. end Association(ABCContextHandleList) 152.

Figure 2A:
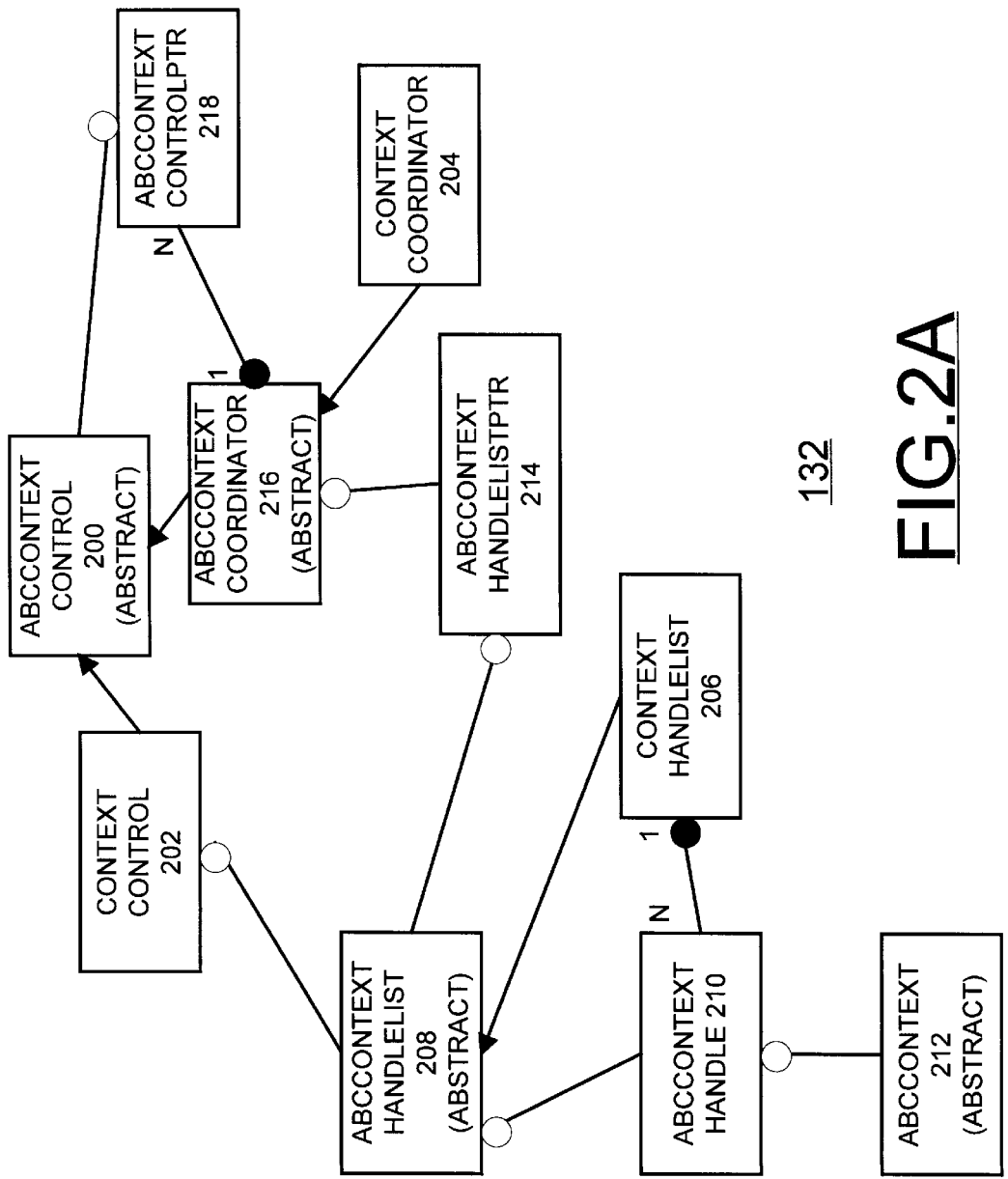
FIG. 2A is a block diagram representation illustrating classes of a context manager in accordance with the preferred embodiment.

Referring now to FIG. 2A, there is shown the architecture of context manager 132. In FIG. 2A, inheritance is represented by pointers or lines between classes including arrows, where the arrow points to the class from which another class inherits. In FIG. 2A, open connectors on lines between classes represent that the class adjacent the open connector uses or references the other class, and solid or filled connectors indicate that the referenced class is created and the storage is managed by the proximate class to the solid connector. An object cannot be created from an abstract class. The purpose of an abstract class is to provide a base of inheritance for derived classes.

Context manager 132 includes an ABCContextControl 200, a ContextControl 202, a ContextCoordinator 204, and a ContextHandleList 206. The ABCContextControl 200 is an abstract base class (ABC) interface. ContextControl 202 is a base class for ContextControl objects which provides a default implementation for the ABCContextControl 200. ContextCoordinator 204 is a main coordinator class for coordinating calls to ContextControl objects. ContextHandleList 206 is a list whereby a ContextControl object 140 puts its context into or takes it out of when requested. The ContextHandleList 206 inherits from an abstract base class ABCContextHandleList 208. The ContextHandleList 206 contains from 1 to N of an abstract base class ABCContextHandle 210. The ABCContextHandleList 208 uses the ABCContextHandle 210. The ABCContextHandleList 210 references an abstract base class ABCContext 212. An abstract base class ABCContextHandleListPtr 214 references the ABCContextHandleList 208. Context manager 132 includes an abstract base class ABCContextCoordinator 216. ContextCoordinator 204 inherits from the abstract base class ABCContextCoordinator 216 and provides an implementation of its interface. ABCContextCoordinator 216 contains from 1 to N of an abstract base class ABCContextControlPtr 218 and uses the ABCContextHandleListPtr 214.

The ABCContextControl interface 200 is used by the ContextCoordinator 204 so that the ContextCoordinator 204 can forward all of the method calls onto the ContextControl objects 140 it manages, which support ABCContextControl interface 200. The main ContextCoordinator 204 manages its ContextControl objects 140. ABCContextControl 200 provides the interface for the methods that are used to manage contexts on threads 138 including getAndSuspendContext(ABCContextHandleList) 146, setAndResumeContext(ABCContextHandleList, ServiceContext) 148, copyContext (ABCContextHandleList) 150, endAssociation (ABCContextHandleList) 152, init() 142, and uninit() 144. Each object service 134 may have a different way of dealing with its context. Object service 134 creates its own ContextControl object 140 which it registers with the ContextCoordinator 204. Within each ContextControl object 140 resides logic to handle its context in a way which is appropriate to the object service 134 it supports.

ContextControl 202 provides a base class for other ContextControl objects. ContextControl 202 implements empty methods so that if code which subclasses off of it chooses not to override all methods, the methods can still be safely called. ContextControl objects 140 registered with the main ContextCoordinator 204 will be deleted by the ContextCoordinator 204 when the server is terminating. If a ContextControl object 140 needs to clean up resources, it needs an implementation of a destructor or the uninit method 144. The ContextHandleList 206 is simply a list which maps a ContextControlID to a ContextHandle. ContextHandleList 206 is used as a vehicle to move context onto and off of threads 138.

Referring to FIG. 2B, the ContextCoordinator 204 supports methods for registering and unregistering the ContextControl Objects 140. The use of the registration process is two fold. First, the registration process lets the ContextCoordinator 204 store a reference to the ContextControl object 140 which it will need to call later. Second, the registration process provides a mechanism for the ContextCoordinator 204 to provide a key, a ContextControlID by which the ContextHandleList 206 can be searched.

The signatures for the methods for registering and unregistering the ContextControl Objects 140 are as follows:

registerContextControl(ContextControlName, ABCContextControlPtr) 220;

ContextControlId registerContextControlForID (ContextControlName, ABCContextControlPtr) 222; and ABCContextControlPtr unregisterContextControl (ContextControlName) 224;

where ContextControlName is the name (string) of the ContextControl object 140 which is registering; ABCContextControlPtr 218 is a reference to the ContextControl object 140; and ContextControlID is a unique identifier generated by the ContextCoordinator 204 with the registerContextControlForID method 222. The ContextCoordinator 204 maintains the mapping between the ContextControlName and the ContextControlID. The ContextControlID is saved by the ContextControl object 140 and used for accessing the ContextHandleList 206. The registerContextControl (ContextControlName, ABCContextControlPtr) method 220 is used to register those ContextControl objects 140 which never have need to provide a context and thus have no need for an ID to index the ContextHandleList 206. The unregisterContextControl (ContextControlName) 224 is used to unregister a ContextControl object 140 for the given ContextControlName.

Referring now to FIGS. 1C, 2, 3A, 3B, 4A, and 4B, the methods 142, 144, 146, 148, 150 and 152 of the ContextControl Objects 140 may be understood as follows. After a server process 302 of FIG. 3A has completed initialization, but before the server process 302 starts accepting method requests from a client process 300, the init() method 142 is called on the ContextCoordinator 204. ContextCoordinator 204 calls the init() method 142 on each ContextControl object 140 which is registered with it. The functions performed in the init() method 142 are those that specifically require other objects, for example, other ContextControl Objects 140, to have already been created.

The uninit() method 144 is called after a ThreadManager 304 has destroyed all of its threads, but before it deletes the ContextCoordinator 204. The uninit() method is called on the ContextCoordinator 204 and the ContextCoordinator 204 calls the uninit method 144 on each ContextControl object 140 which is registered with it. The uninit method 144 functions as a destructor, with an added benefit that other ContextControl objects 140 it may need will still be there.

The getAndSuspendContext(ContextHandleList) method 146 is called to allow the service to suspend its association of context with the current thread 138, and return a context handle to the suspended context via the ContextHandleList 206. For services which cannot move context between threads 138, then these services do nothing or perform no operation responsive to the getAndSuspendContext (ContextHandleList) method 146 being called. For services which can move their context between threads 138, then these services remove the current context from the current thread 138 and pass back a handle to the suspended context. If this particular service must have a context on the thread 138 it would then place a default context on the thread. The getAndSuspendContext() method 146 implemented for a particular service places a handle to the context it just removed into the ContextHandleList 206 which is then returned to the ContextCoordinator 204.

The setAndResumeContext() method 148 is called to allow an object service 134 to optionally place a different context, provided in the ContextHandleList and/or the ServiceContext, onto the current thread 138 and allow the service to establish an association between the context and the thread. After all ContextControl objects 140 have executed this method 148 the thread 138 should be in a state ready to execute the request. It should be understood that the setAndResumeContext method 148 may be run without a getAndSuspendContext method 146 having been previously run.

For example, the ServiceContext may be NULL, such as the case when the getAndSuspendContext method is called in the situation where a ServiceContext is not available or does not make sense for the call. Service context is received from outside the server process 302 when receiving a request, such as, is received with the request, execMethodBOnObjectA of step 1 of FIGS. 3A, 3B. The ContextControl 202 receiving the setAndResumeContext method 148 takes an appropriate action when the ServiceContext is NULL.

Also, the ContextHandleList 206 may be NULL, such as the case when a getAndSuspendContext method 146 was not called prior to this call for the setAndResumeContext() method 148. Then the ContextControl objects 140 take the appropriate action. For the first type of services which cannot move context between threads 138, the first type of services establish a context if one has not already been established. For the second type of services which can move their context between threads 138, when the service keeps an association between a context and some attribute, such as, transactionID and it was the first time the service 134 saw this attribute, then this attribute is associated to some default context and put on the thread 138. If the service kept an association between the context and some attribute like transactionID and it was not the first time it saw this attribute, it could choose whether to use the associated context or the service context passed in on the setAndResumeContext call.

The copyContext(ContextHandleList) method 150 is called to allow copying the current context from one thread 138 to another without suspending the source thread 138. This function of method 150 enables spawning a new thread 138 to have the new thread inherit context from the first thread 138 without suspending or removing the context from the first source thread 138.

The endAssociation(ContextHandleList) method 152 is called to notify all dependent services to end their association for those services which keep an association between some attribute, like transactionID, and some context. The ContextHandleList 206 should, at a minimum, contain the ContextHandle for that service which the other services are dependent. For example, when a transaction service ends a transaction, the association between the transactionID and the matching context needs to end. The transaction service puts its context, which contains the transactionID, in the ContextHandleList 206 and calls the endAssociation method 152. A particular ContextControl Object 140 for dependent services looks in the transaction service context to find the transactionID and end the association. Then, the ContextControl 202 optionally can simply delete the context, or change it into a default context, or simply mark it as reusable for a future transaction. For those ContextControl Objects 140 which do not care about this association, the endAssociation method 152 provides no operation. If the ContextHandleList 206 is NULL, this indicates that the thread 138 is about to be removed from the process and any thread related cleanup should then be provided.

Whenever a ContextControl object 140 is asked to perform an operation, for example the getAndSuspendContext method 146, it is provided a ContextHandleList 206, the ContextControl object 140 gathers any context information it keeps which it wants to forward to a potential setAndResumeContext call and places it in the ContextHandleList 206. The context information needs to be place in global storage, such that another thread 138 can access it later. The ContextControl object 140 then sets a pointer to this context into the ContextHandleList 206. All ContextControl objects 140 get the same getAndSuspendContext call, and, when finished, the ContextHandleList 202 contain the contexts for all ContextControl objects 140. If the context is now to be moved to a new thread 138, a call goes out to all the ContextControl objects 140 to setAndResumeContext, and they would be passed the ContextHandleList 206. Each ContextControl object 140 could use as the information in the context contained in the ContextHandleList 206 to help set their context up on the new thread 138.

The ContextCoordinator 204 is responsible for coordinating the actions of multiple ContextControl objects 140. Any requirements of relationships between the ContextControl objects 140 is handled by an implementation of ABCContextCoordinator 216. The ContextCoordinator 204 manages the calls to the ContextControl objects 140 in multiple situations including as requests are received into the server, as replies are sent from the server, and as threads are destroyed. Each service 134 that bases any behavior on the information on the thread 138 should have a ContextControl object 140 registered with the ContextCoordinator 204.

First consider the first type of services, such as database programs where multiple requests to the same server which are part of the same transaction need to run on the same thread. A ContextControl object 140 is created for this particular type of object service 134 and is registered with the ContextCoordinator 204 at server startup. The thread manager 304 is arranged such that it knows how to get the Transaction ID contained in the service context. The thread manager 304 uses this Transaction ID to map to the same execution thread for multiple requests which are part of the same transaction. The first time setAndResumeContext is called for this execution thread, the ContextControl object 140 for the database service sets up the context on the thread. Since these services then always run on the same thread 138, the thread does not need to set up again for this transaction in the future, but thread manager 304 will need to keep track as to whether or not this thread has already been set up for the current transaction. When a future request comes in for this transaction, the thread manager 304 switches to the same thread 138 already dedicated for the transaction. When the transaction is finished, the service tracking the transaction calls endassociation on the ContextCoordinator 204 which forwards the call. When the ContextControl Object 140 for the database service is called to execute its endassociation, it then cleans up any context on the thread which is associated with the transaction which just ended.

Second consider the second type of services, such as a database program that allows you to take a context off of one thread an put it onto another. The context manager 132 does not require any special modification to the thread manager 304. A ContextControl object 140 is created for this particular database and is registered with the ContextCoordinator 204. This ContextControl object 140 keeps a table which maps transactions to contexts. When setAndResumeContext method 148 is called for this ContextControl object 140, it gets the transaction ID from either the Service context, or the ContextHandleList 206 and checks its table. If the ContextControl object 140 does not have the transaction in its table, it makes an entry in the table associating this new transaction to an unused context, which may be a default context. Once this is done the ContextControl object 140 resumes that context on the current thread. Next the method request is executed on the target object. Once, the method request is finished, the getAndSuspendContext call is made and forwarded to this ContextControl object 140. At this time the getAndSuspendContext method 146 takes the context off of the current thread and puts it back into its table. At the same time it places a reference to the context in the ContextHandleList 206 which it returns. As the server is shutting down an uninit call is forwarded to the ContextControl 202. At this time the ContextControl objects 140 release any contexts which are still being kept in their tables.

Referring now to FIGS. 3A, and 3B, there is shown a high level flow chart of call sequences when a request to execute a method on an object comes into the server. Prior to the method being executed the context on the thread is set up utilizing the context manager 132. After the method finishes executing, the context on the thread may be cleaned up utilizing the context manager 132.

In step 1, a request to execute method B on an objecta is received by a server process 302 from a client process 300. The server process 302 calls the thread manager 304 to have the request execute in its own thread 138 and the thread manager 304 switches to an appropriate thread and returns, in steps 2 and 3. In step 4, the thread manager 304 calls setAndResumeContext on the main ContextCoordinator 204 passing it the service context it received on the incoming request from the client process 300. In step 5, the ContextCoordinator 204 forwards the setAndResumeContext call to each ContextControl object 140. Each individual ContextControl object 140 for the service or program for which the ContextControl object 140 was written, sets up the context on the current thread 138, typically using context information passed in the ServiceContext. Once the current execution thread 138 is setup, the thread manager 304 calls an object request broker (ORB) 310 to allow the method requestB on the objecta to run. In step 8, after the method requestB completely finishes, the thread manager 304 calls getAndSuspendContext on the ContextCoordinator 204. In step 9, the ContextCoordinator 204 forwards the getAndSuspendContext call to context control 202 and the ContextControl objects 140. The getAndSuspendContext call allows the ContextControl objects 140 to suspend any active context before the thread manager 304 puts the execution thread 138 into a wait state. In step 10, the thread manager 304 puts the thread into a wait state returning the thread 138 to a thread pool.

Figure 4A:
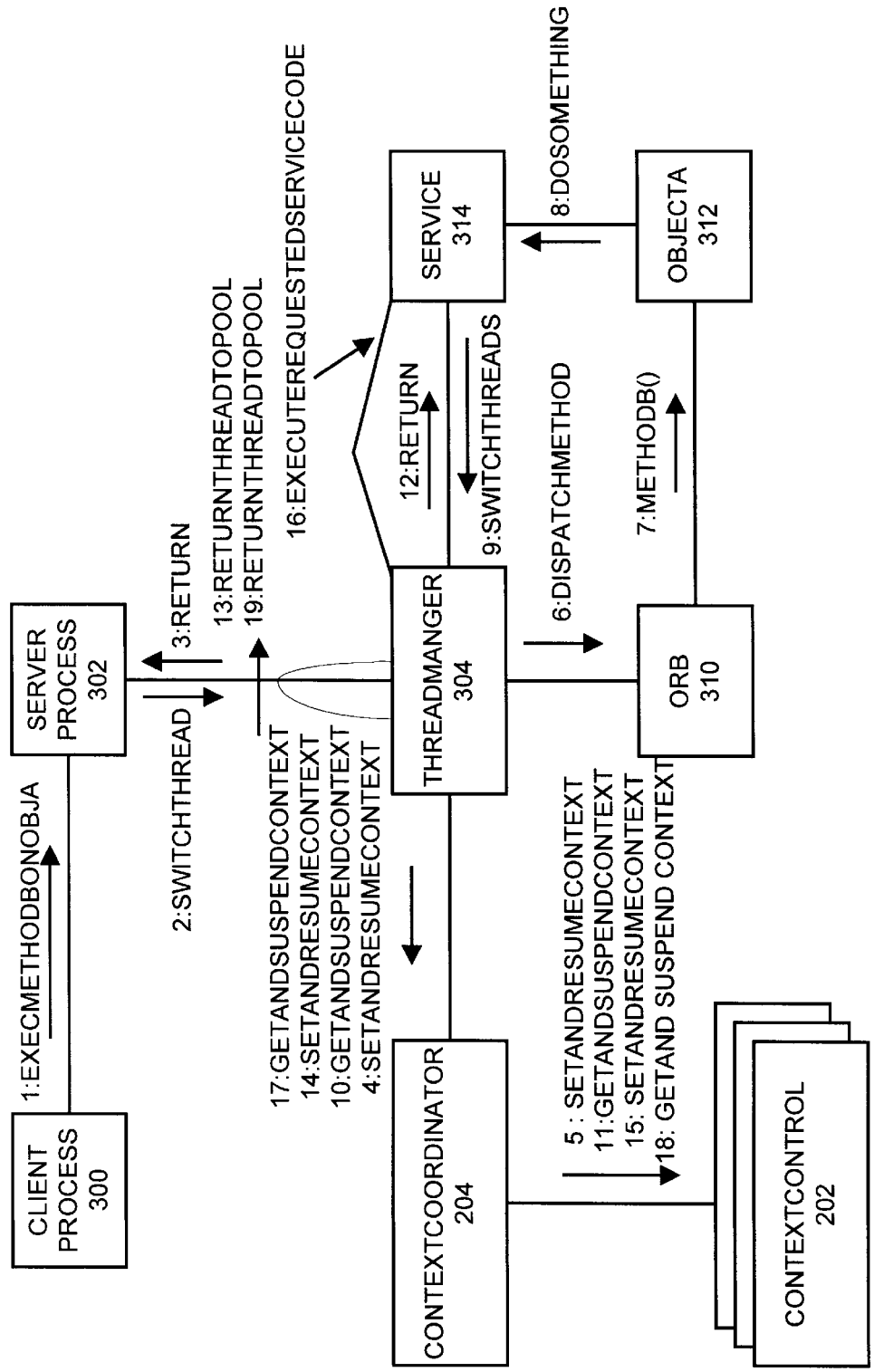
FIGS. 4A and 4B together provide another flow chart illustrating exemplary sequential steps or calls when a request to execute a method on an object is received by a server process in accordance with the preferred embodiment.
Figure 4B:
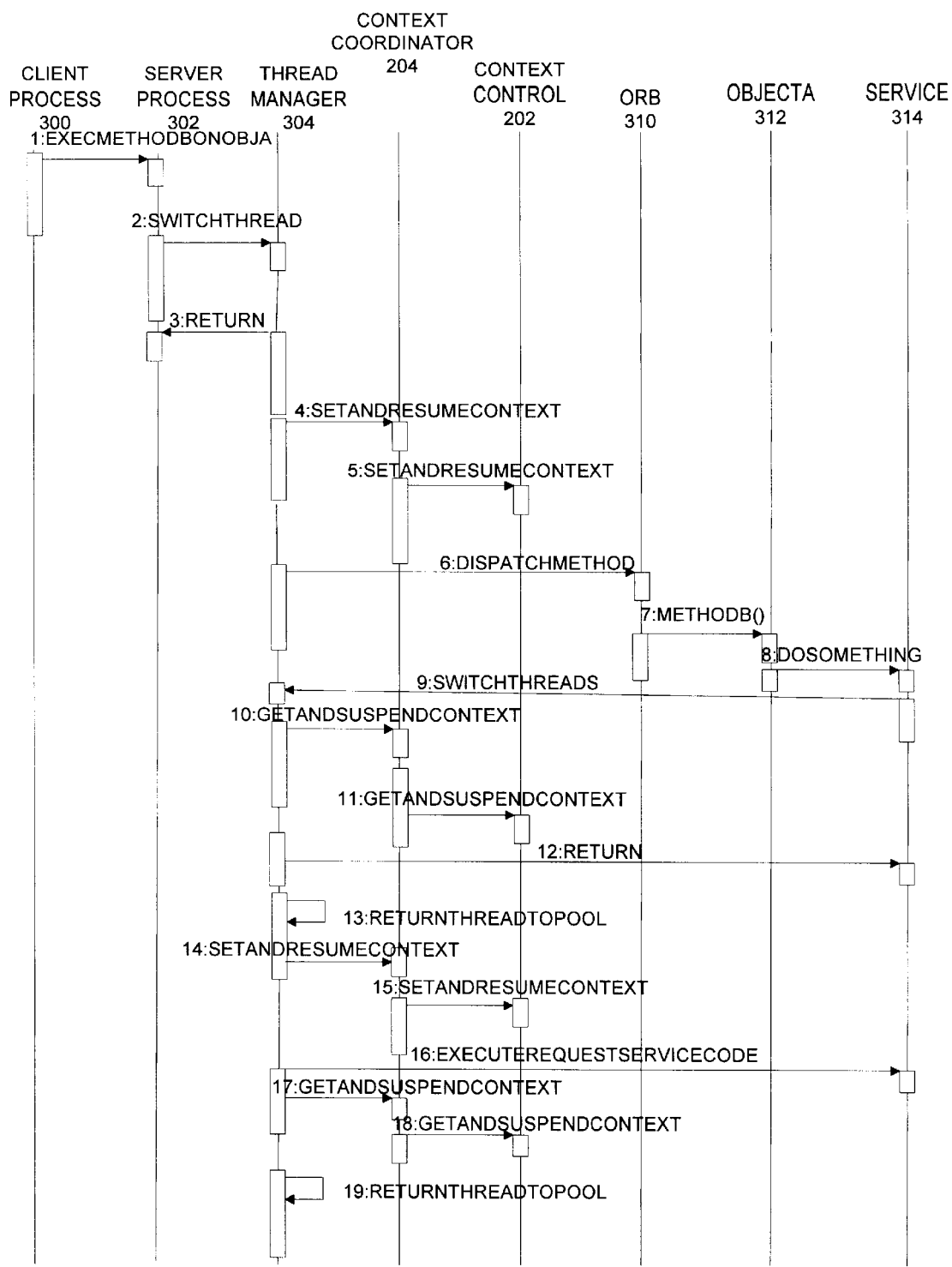

Referring now to FIGS. 4A, and 4B, there is shown another high level flow chart of call sequences when a request to execute a method on an object comes into the server process 302. In FIGS. 4A, and 4B, sequential call steps 1 through 7 are performed as described with respect to FIGS. 3A and 3B. At step 8, target objectA calls a service 314 to do something. During the method, one of the services 314 which is being used decides it needs to change threads 138 so it calls the thread manager 304 to switch threads in step 9. In order to make sure that the new thread 138 is setup properly the thread manager 304 needs to move the context from the current thread to the new thread. In step 10, thread manager calls getAndSuspendContext on the ContextCoordinator 204 passing the ContextCoordinator 204 a ContextHandleList 206. At step 11, ContextCoordinator 204 forwards the getAndSuspendContext call to all of its ContextControl objects 140 and the ContextControl objects 140 suspend their contexts and place the context information in the ContextHandleList 206. In step 12, the thread manager 304 switches to a new thread and then returns to the service 314. In step 13, thread manager 304 returns the thread 138 to the thread pool. In step 14, the thread manager 304 calls setAndResumeContext on the ContextCoordinator 204 passing the ContextHandleList. In step 15, the ContextCoordinator 204 running on the new thread, again forwards the call and the ContextControl objects 140 get their context out of the ContextHandleList 206 and use it to restore their context on the current new thread 138. In step 16, the thread manager 304 passes a call to the service 314 to execute requested servicecode. In step 17, after the requested servicecode completely finishes, the thread manager 304 again call getAndSuspendContext on the ContextCoordinator 204. At step 18, ContextCoordinator 204 forwards the getAndSuspendContext call to all of its ContextControl objects 140 and the ContextControl objects 140 suspend their contexts and place the context information in the ContextHandleList 206. This give the ContextControl objects a chance to suspend any active context before the thread manager puts the thread into a wait state. At step 19, the thread manager 304 puts the thread into a wait state.

It should be understood that the illustrated call sequences of FIGS. 3A, 3B, 4A and 4B are exemplary sequences. For example, in order to provide two threads with context enabled and running in parallel, the getAndSuspendContext calls of steps 10 and 11 are replaced by copyContext calls at steps 10 and 11.

Figure 5:
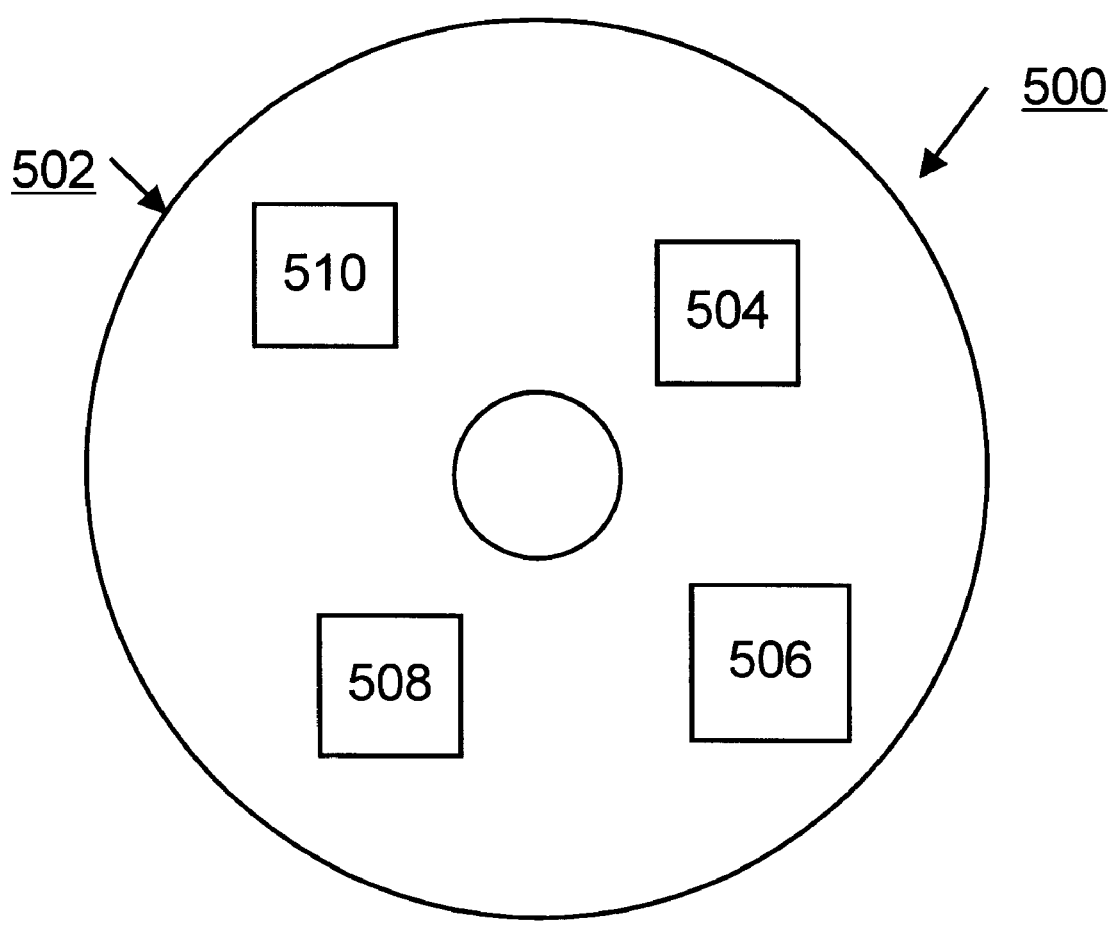
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the object oriented thread context management methods of the preferred embodiment in the system 100 of FIGS. 1A and 1B.

A sequence of program instructions or a logical assembly of one or more interrelated modules defined by the recorded program means 504, 506, 508, 510, direct the computer system 100 to provide object oriented thread context management of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for object oriented thread context management, said method comprising the steps of:

providing a context manager for managing a plurality of ContextControl objects, each said ContextControl object comprising a plurality of methods for associating and disassociating context on an execution thread for a target object;

receiving a method request for a target object at a server process and said server process calling a thread manager to obtain an execution thread;

said thread manager calling said context manager for associating context with a current execution thread for said method request;

said thread manager dispatching said method request for said target object responsive to said context manager providing associated context with said current thread; and said thread manager calling said context manager for disassociating context with said current execution thread.

2. A computer-implemented method for object oriented thread context management as recited in claim 1 wherein said context manager includes a ContextCoordinator for coordinating actions of said plurality of ContextControl objects and wherein the step of providing said context manager for managing said plurality of ContextControl objects includes the step of registering said plurality of ContextControl objects with said ContextCoordinator.

3. A computer-implemented method for object oriented thread context management as recited in claim 2 wherein the step of registering said plurality of ContextControl objects with said ContextCoordinator includes the steps of storing a name and a reference pointer to each said ContextControl object.

4. A computer-implemented method for object oriented thread context management as recited in claim 2 wherein the step of said thread manager calling said context manager for disassociating context with said current execution thread includes the steps of said thread manager being notified of said method request completed, and said thread manager calling said ContextCoordinator with a getAndSuspendContext method, said getAndSuspendContext method forwarded to said plurality of ContextControl objects by said ContextCoordinator.

5. A computer-implemented method for object oriented thread context management as recited in claim 1 includes the step, responsive to receiving a thread switch request, of said thread manager calling said context manager for disassociating context with said current execution thread, said thread manager switching to a new execution thread and calling said context manager for associating context with said new execution thread.

6. A computer program product for use in a computer system having a central processor for implementing object oriented thread context management, the computer program product comprising:

a recording medium;

means, recorded on the recording medium, for providing a context manager, said context manager for managing a plurality of ContextControl objects, each said ContextControl object comprising a plurality of methods for associating and disassociating context on an execution thread for a target object;

means, recorded on the recording medium, for registering said plurality of ContextControl objects with said context manager; and means, recorded on the recording medium, for providing a thread manager, said thread manager obtaining an execution thread; said thread manager calling said context manager for associating context with a current execution thread and said thread manager calling said context manager for disassociating context with said current execution thread.

7. A computer program product for use in a computer system having a central processor for implementing object oriented thread context management as recited in claim 6 wherein said means, recorded on the recording medium, for registering said plurality of ContextControl objects with said context manager include means, recorded on the recording medium, for storing a name and a reference to each said ContextControl object.

8. A computer program product for use in a computer system having a central processor for implementing object oriented thread context management as recited in claim 7 wherein said means, recorded on the recording medium, for providing said context manager for managing said plurality of ContextControl objects include means, recorded on the recording medium, for creating a ContextHandleList for mapping an identifier for said ContextControl object to a pointer to a context for said ContextControl object.

9. An object oriented thread context manager for a computer system including a thread manager for managing multiple threads, said object oriented thread context manager comprising:

a ContextControl class of a plurality of ContextControl objects, each said ContextControl object comprising a plurality of methods for associating and disassociating context on an execution thread for a target object;

a ContextCoordinator class for managing calls to said plurality of ContextControl objects; and a ContextHandleList for storing context information for said ContextControl objects.

10. An object oriented thread context manager as recited in claim 9 further includes an interface abstract base class (ABC) ContextControl, said ABCContextControl used by said ContextCoordinator class for forwarding calls to said plurality of ContextControl objects.

* * * * *